E. A. STREET.
Manufacture of Hydraulic Hose.
No. 5,930. Reissued June 23, 1874.
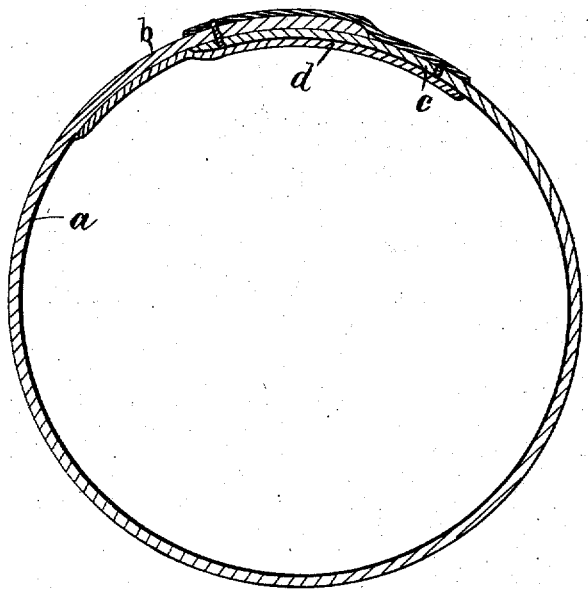
Witnesses.
George T. Smallwood Jr.
Carlos Hickenlooper
Inventor.
Edwin A. Street.
per John J. Halsted.
Atty.
AM. PHOTO-LITHOGRAPHIC Co. N. Y. (OSBORNE'S PROCESS.)

UNITED STATES PATENT OFFICE.

EDWIN A. STREET, OF LYNN, ASSIGNOR TO THEODORE A. DODGE, TRUSTEE OF THE BLAKE HOSE ASSOCIATION, OF BOSTON, MASSACHUSETTS.

IMPROVEMENT IN THE MANUFACTURE OF HYDRAULIC HOSE.

Specification forming part of Letters Patent No. 142,054, dated August 19, 1873; reissue No. 5,930, dated June 23, 1874; application filed May 2, 1874.

*To all whom it may concern:*

Be it known that I, EDWIN A. STREET, of Lynn, in the county of Essex and State of Massachusetts, have invented an Improvement in the Manufacture of Hydraulic Hose; and I do hereby declare that the following, taken in connection with the drawings which accompany and form part of this specification, is a description of my invention sufficient to enable those skilled in the art to practice it.

In the manufacture of that class of hydraulic hose in which each piece or section is made of a rubber-surfaced strip of woven material, having its edges lapped and united to form the tube, some difficulty has been experienced in making the seam or junction at the lapped edges tight.

In my invention, after having formed the tube by uniting the edges, I vulcanize the tube, and by vulcanization homogeneously unite the rubber surfaces on the opposite sides of the edge where the junction begins, by which means I obtain a jointless or seamless surface at such edge as impervious as any other part of the coated surface.

My invention further consists in the use of a welt-strip formed of rubber and laid under the inner edge, or against the inner surface, so as to cross or cover the edge, and I also prefer to make the same strip cover the fastenings, if fastenings be used.

My invention consists primarily in hydraulic hose made of a strip of rubber-surfaced woven material, which being formed into a tube by lapping the opposite edges is vulcanized to homogeneously unite the rubber surfaces at the respective sides of the edge, to imperviously close the seam or junction, such invention being preferably supplemented by the use of the welt.

The drawing represents a cross-section of a piece of hose embodying my invention.

*a* denotes the strip of cloth; *b* and *c* the edges brought together and lapped and united to form the tube; *e*, the rubber surface of the strip; *f*, the welt-strip.

The parts being arranged as shown, the tube is vulcanized by filling it with French chalk, or other suitable material, to prevent adhesion of the inner surfaces of the tube, and, if necessary, to create pressure, and then subjecting it to the action of steam or other heat; or the tube may be filled with steam under pressure, or any other suitable method of vulcanization may be employed.

I claim—

1. A hose which, being made of a rubber-surfaced strip of fibrous material with edges lapped and united to form the tube, is vulcanized to close the seam or junction, substantially as described.

2. In combination with the hose or tube formed of the imperviously-surfaced strip, a welt vulcanized over the junction or fastenings, or both, substantially as described.

E. A. STREET.

Witnesses:
M. W. FROTHINGHAM,
S. B. KIDDER.